(12) United States Patent
Blaschke

(10) Patent No.: US 6,510,782 B1
(45) Date of Patent: Jan. 28, 2003

(54) SYSTEM FOR ELECTRONICALLY MONITORING SCALING IN AN APPARATUS FOR HEATING AND/OR EVAPORATING A LIQUID

(75) Inventor: Günter Blaschke, Holzhausen (DE)

(73) Assignee: Rational Aktiengesellschaft, Landsberg/Lech (DE)

( * ) Notice: Subject to any disclaimer, the term of this patent is extended or adjusted under 35 U.S.C. 154(b) by 0 days.

(21) Appl. No.: 09/913,634
(22) PCT Filed: Mar. 10, 2000
(86) PCT No.: PCT/DE00/00803
§ 371 (c)(1), (2), (4) Date: Aug. 16, 2001
(87) PCT Pub. No.: WO00/56195
PCT Pub. Date: Sep. 28, 2000

(30) Foreign Application Priority Data

Mar. 19, 1999 (DE) ............................ 199 12 444

(51) Int. Cl.[7] ............................................... A47J 31/54
(52) U.S. Cl. .................. 99/285; 99/280; 99/286; 392/457; 220/567.3
(58) Field of Search ......................... 99/286, 280, 281, 99/282, 283, 300, 279, 285, 288; 392/311, 314, 322, 465, 471, 497, 441, 457; 220/567.3

(56) References Cited

FOREIGN PATENT DOCUMENTS

| DE | 25 56 231 B1 | 3/1977 |
|---|---|---|
| DE | 26 52 399 A1 | 5/1978 |
| DE | 28 39 062 C2 | 3/1980 |
| DE | 28 43 655 A1 | 5/1980 |
| DE | 42 18 440 A1 | 12/1993 |
| EP | 0 191 267 B1 | 8/1990 |
| EP | 0 383 327 B1 | 8/1990 |

Primary Examiner—Reginald L. Alexander
(74) Attorney, Agent, or Firm—Schiff Hardin & Waite

(57) ABSTRACT

A system for electronically monitoring scaling in an apparatus for heating and/or evaporating a liquid, comprising a container for at least temporarily receiving the liquid. The container comprises a liquid inlet, a liquid outlet and/or a vapor outlet and a heating element for evaporating liquid from the container. An evaluation unit is connected to at least one liquid level indicator and at least one flowmeter. A value relating to a desired filling volume of the container can be inputted into the evaluation unit and/or can be stored therein. The desired filling volume can be compared to a nominal liquid level in the evaluation system when water is constantly added by the flow meter, whereby the nominal liquid level is detected by the liquid level indicator, or to a nominal filled-in quantity detected by the flowmeter when the liquid flow indicator regulates the level of the filled-in liquid. A signal can be sent by the evaluation unit, wherein the signal is a measure of the absolute nominal liquid level, the absolute nominal filled-in quantity, the nominal liquid level relative to the desired liquid level, and/or the nominal filled-in quantity relative to the desired filled-in quantity.

12 Claims, 1 Drawing Sheet

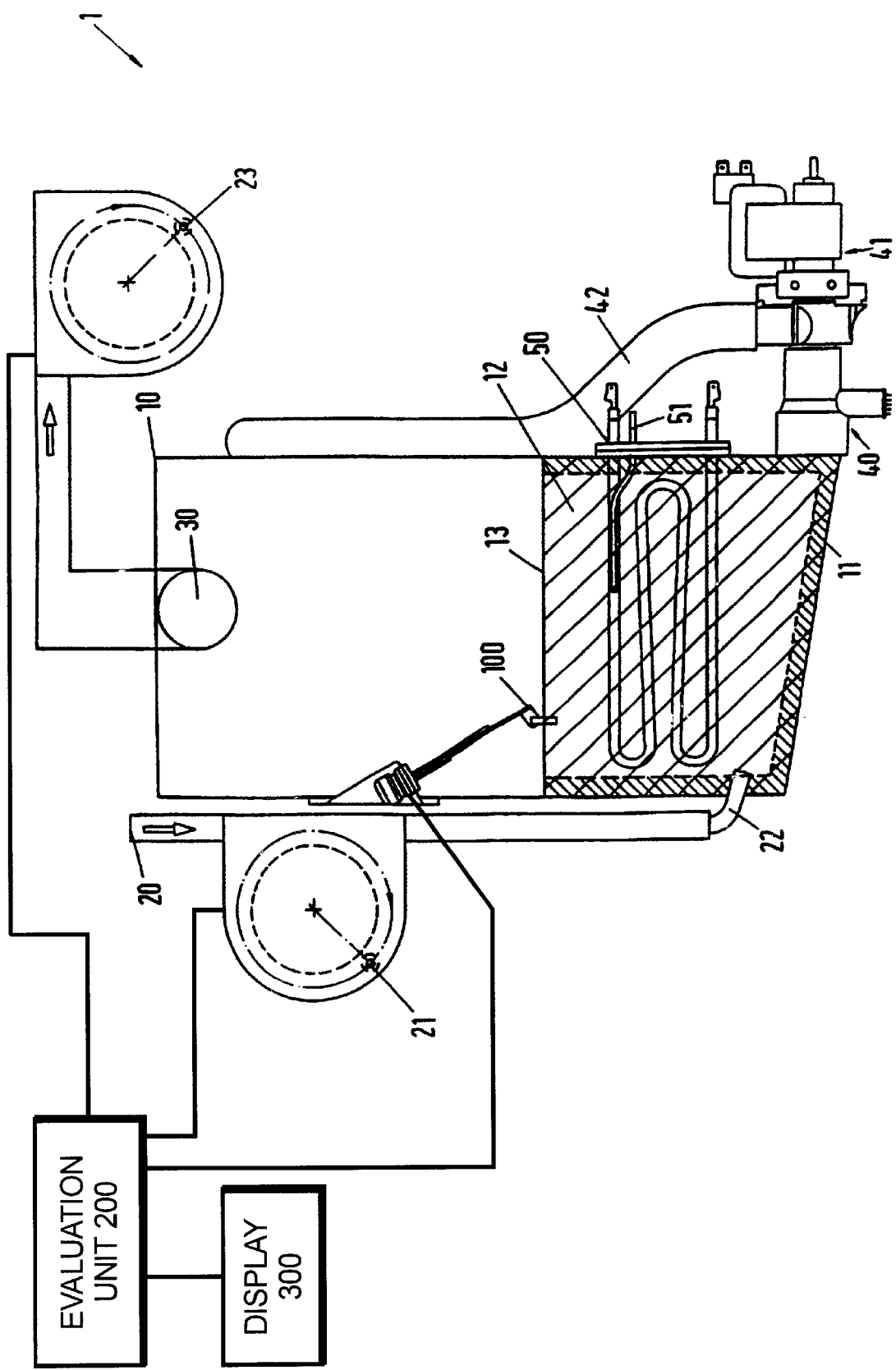

SYSTEM FOR ELECTRONICALLY MONITORING SCALING IN AN APPARATUS FOR HEATING AND/OR EVAPORATING A LIQUID

BACKGROUND OF THE INVENTION

1. Field of the Invention

The present invention relates to electronic monitoring systems, and in particular to systems for electronically monitoring scaling in an apparatus for heating and/or evaporating a liquid.

2. Discussion of the Related Art

Numerous systems of this type are known in the prior art, wherein either temperature changes, as they result from measuring the temperature and partially their time curve, or current changes, particularly with respect to galvanically separated current supplies to a heating element, are acquired.

For example, German Patent 42 18 440 A1 discloses a coffee machine or tea machine comprising a flow heater, which is composed of a water-carrying flow pipe and a heating aggregate, and a scaling indicator, whereby the scaling indicator has an indicator lamp arranged in a housing wall, whereby said indicator lamp is switched on given a specific temperature increase in the surrounding area of the flow heater as a result of scaling of the flow pipe.

German Patent 28 39 062 C2 discloses a further device for a flow heater, whereby the heating element has respectively individually galvanically separated current supplies in the area of the liquid input and the liquid output and whereby a circuit is provided with which a relative current change in these current supplies is used for these two areas as signal voltage for an indicator.

German Patent 26 52 399 A1 discloses an electrical coffee machine having a scaling indicator, which has a water level measuring device or water level adjusting device coupled with a timer. This scaling indicator requires great switching outlay.

German Patent 28 43 655 A1 discloses a device for the communication of a specific scaling degree of hot-water apparatuses, particularly coffee machines, by using a measuring chamber having an admission through which at least a partial amount of the generated hot water is led into the measuring chamber, whereby this cannot be transferred to steam generators, wherein a hot-water outlet is not traversed during the operation of the steam generator.

Besides, numerous systems and methods for removing lime deposits in order to assure a perfectly operating device for heating and/or vaporizing a liquid are certainly known. For example, European Patent 0 383 327 B1 discloses a steam generator for a cooking device, such as a tabletop device or standalone device using hot-air and hot steam as a combination for the gastronomy, large kitchens or suchlike, with a water-filled boiling vessel comprising an automatically level-regulated water inlet, a steam outlet for automatically introducing hot steam as needed into the cooking area of the cooking device and a heating device operating in intervals, and a decalcification device comprising a water outlet means that is arranged close to the bottom and the sidewall of the boiling vessel for at least partially emptying the boiling vessel as needed in order to flush out lime particles that have flaked off and that have accumulated at the bottom of the boiling vessel. The water outlet device has a flush-out pump, which is automatically switched on in adjustable intervals dependent on the operating time and/or operating temperature of the heating device, while a flush-out stream of water, which can be switched on and off together with the flush-out pump, is arranged close to the bottom of the boiling vessel at a location close to the wall of the boiling vessel, whereby said location is essentially diametrically situated opposite the flush-out pump, so that lime particles accumulating at the bottom of the boiling vessel as a result of the intense currents and the forced transport are reliably flushed out by the flush-out pump.

Regulation of a level within a container is well known to someone skilled in the art via a level measurer or, respectively, a liquid level sensor, and also is described in European Patent 0 191 267 B1, which also discusses decalcification of a container by removing limestone.

Conventionally, decalcification is performed at regular intervals, which are based on statistic extrapolations of operating times and experimental values, without actual calcification conditions being considered.

SUMMARY OF THE INVENTION

It is an object of the present invention to simply and reliably monitor the scaling status of an apparatus for heating and/or evaporating a liquid.

It is a further object of the present invention to provide a flow meter that acquires a liquid flow rate and/or evaporation rate.

It is an additional object of the present invention to provide a flow meter as a pulse counter.

It is yet another object of the present invention to provide a first flow meter upstream of a container and/or a second flow meter downstream of the container.

It is another object of the invention to provide a signal that indicates the difference between a nominal filling volume and a desired filling volume determined from the nominal liquid level or the nominal filled-in quantity exceeds at least a specific threshold value.

It is yet a further object of the invention to provide a display unit, which receives the signal of the evaluation unit and outputs an optical and/or acoustic warning message dependent on the signal, in the form of illuminated symbols, when the evaluation unit and the display unit are integrally implemented.

It is still another object of the present invention to provide a decalcification process that can be automatically initiated via an evaluation unit.

It is still a further object of the present invention to provide an apparatus for heating and/or vaporizing a liquid having a steam generator, preferably for a cooking device.

It is still an additional object of the present invention to easily monitor changes in the filling volume of a container due to lime deposits in order to be able to indicate when decalcification must be carried out, and/or to have decalcification automatically carried out, as soon as necessary.

Further features and advantages of the invention derive from the following specification in which an exemplary embodiment of the invention is explained in greater detail.

BRIEF DESCRIPTION OF THE DRAWING

FIG. 1 shows a steam generator according to the present invention.

DETAILED DESCRIPTION OF THE PRESENTLY PREFERRED EMBODIMENTS

As can be seen in FIG. 1, a steam generator 1, when operated, heats up water 12 in a container 10 via a heating element 50. The container 10 is provided with a water inlet 20, a steam outlet 30 and a drain unit 40. A water level sensor 100 is arranged within the container 10. Steam generator 1 is suitable for use as a cooking device, particularly for tabletop devices or standalone devices using hot-air and hot steam, such as in large kitchens or suchlike, whereby the steam outlet 30 can end in a cooking chamber (not shown).

Operation of the steam generator 1 using the inventive system will now be discussed.

To begin with, water is filled via the water inlet 20, a flow meter 21, such as a pulse counter acquiring the filled-in water quantity, and a filling pipe 22 into the container 10. The water 12 is heated up via the heating element 50, whose temperature is acquired by a temperature sensor, and is eventually vaporized. This steam penetrates from the steam outlet 30, whereby the penetrating quantity is acquired via a flow meter 23.

Among other things, lime deposits 11 deposit at the walls of the container 10 in the course of operating the steam generator 1, so that either the nominal or actual height of the water level 13, which is acquired by the water level sensor 100, increases when water is constantly added by the flow meter 21 and given the discharged steam quantity measured via the flow meter 23, or—in the case of a level-regulated water filling using the water level sensor 100—the filled-in quantity or volume acquired via the flow meter 21, upon consideration of the outlet steam quantity measured via the flow meter 23, is reduced. Thus, lime deposits 11 can be determined either via the increase in the height of the nominal or actual water level 13 when compared to the desired water level or via the reduction of the filled-in water quantity or volume upon evaluation of signals of the water level sensor 100 and the flow meter 21 when compared to the desired water quantity or volume.

The water level sensor 100 and the flow meters 21, 23 are connected to an evaluation unit 200, which monitors the scaling status of the container 10 and outputs a signal to a display unit 300, which comprises nine light-emitting bars that can be connected step-by-step, for example, when a threshold value is exceeded, so that a decalcification process can be activated by an operating person or a decalcification process can be automatically initiated as known, for example, from European Patent 0 383 327 B1 upon utilization of an emptying pump 41 of the drain unit 40, whose emptying hose 42 leads to a receiving tub (not shown) or to a waste disposal drain.

Thus, the invention provides a system for electronically monitoring scaling in a simple and compact way, which serves the purpose of reliably preventing a disturbing scaling of the container 10 via the monitoring of the filling volume of the container 10.

Although modifications and changes may be suggested by those skilled in the art to which this invention pertains, it is the intention of the inventors to embody within the patent warranted hereon all changes and modifications that may reasonably and properly come under the scope of their contribution to the art.

What is claimed is:

1. A system for electronically monitoring scaling in an apparatus for heating and/or evaporating a liquid, the system comprising an evaluation unit; and a container having a liquid inlet, an outlet, a heating element for evaporating liquid from the container, at least one liquid level sensor and at least one flow meter, the evaluation unit being connected to the at least one liquid level sensor, so that a value relating to a desired filling volume of the container can be inputted into the evaluation unit and/or can be stored therein and a desired liquid level for the desired filling volume can be compared to a nominal liquid level in the evaluation unit when water is constantly added by the at least one flow meter, whereby the nominal liquid level is detected by the at least one liquid level sensor, or a nominal filled-in volume is detected by the at least one flow meter, when the liquid level sensor senses the desired liquid level and a signal is sent by the evaluation unit, such that said signal is a measure of an absolute nominal liquid level, an absolute nominal filled-in volume, and the nominal liquid level with respect to the desired filling volume and/or the nominal filled-in volume relating to the desired liquid level.

2. A system according to claim 1, wherein the at least one flow meter acquires a liquid flow rate.

3. A system according to claim 2, wherein the at least one flow meter is a pulse counter.

4. A system according to claim 1, wherein one of the at least one flow meter is arranged in the liquid inlet and another flow meter of the at least one flow meter is arranged in the outlet.

5. A system according to claim 4, wherein each flow meter is a pulse counter.

6. A system according to claim 1, which includes a display unit connected to the evaluation unit.

7. A system according to claim 1, wherein the container is a steam generator.

8. A system according to claim 1, wherein the container has a drain unit.

9. A system for electronically monitoring scaling in an apparatus for heating and/or evaporating liquid, the system comprising an evaluation unit; and a container having a liquid inlet, an outlet, a heating element for evaporating liquid from the container, a liquid level sensor and a flow meter in the liquid inlet, said evaluation unit being connected to the liquid level sensor and the flow meter so that it can compare either the desired filling volume to the actual filling volume when the desired liquid level is sensed by the liquid level sensor or compares the desired liquid level to the actual liquid level when the desired filling volume has been added to the container and utilizing the differences in the measured value to determine the amount of scale buildup.

10. A system according to claim 9, which includes a flow meter in the outlet.

11. A system according to claim 10, wherein each of the flow meters is a pulse counter.

12. A system according to claim 9, wherein the container has a drain unit.

* * * * *